(12) United States Patent
Zein et al.

(10) Patent No.: US 12,436,065 B2
(45) Date of Patent: Oct. 7, 2025

(54) METHOD AND DEVICE FOR MEASURING NITROGEN OXIDE AND AMMONIA EMISSIONS FROM AN EXHAUST GAS AFTERTREATMENT SYSTEM FOR COMBUSTION EXHAUST GASES

(71) Applicant: Robert Bosch GmbH, Stuttgart (DE)

(72) Inventors: Thomas Zein, Sindelfingen (DE);
Yunjie Lian, Markgroeningen (DE);
Frank Meier, Stuttgart (DE); Gunther Kegel, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/532,094

(22) Filed: Dec. 7, 2023

(65) Prior Publication Data
US 2024/0210280 A1    Jun. 27, 2024

(30) Foreign Application Priority Data
Dec. 23, 2022    (DE) ............. 10 2022 214 379.5

(51) Int. Cl.
*F01N 11/00*    (2006.01)
*F01N 9/00*    (2006.01)
*G01M 15/10*    (2006.01)

(52) U.S. Cl.
CPC .......... *G01M 15/102* (2013.01); *F01N 9/005* (2013.01); *F01N 11/00* (2013.01); *F01N 11/007* (2013.01); *F01N 2550/02* (2013.01); *F01N 2560/021* (2013.01); *F01N 2560/026* (2013.01); *F01N 2900/1402* (2013.01)

(58) Field of Classification Search
CPC ........ F01N 9/005; F01N 11/00; F01N 11/007; F01N 2550/02; F01N 2560/021; F01N 2560/026; F01N 2900/1402; F01N 2560/025; F01N 9/00; F01N 2900/0601; F01N 2900/0416; F01N 3/2066; F02D 41/1454; F02D 2041/1433
See application file for complete search history.

(56) References Cited

U.S. PATENT DOCUMENTS

| | | | |
|---|---|---|---|
| 9,255,510 B2 * | 2/2016 | Solbrig | B01D 53/9495 |
| 2009/0185954 A1 * | 7/2009 | Qi | F01N 3/208 |
| | | | 422/62 |

(Continued)

*Primary Examiner* — Matthew T Largi
(74) *Attorney, Agent, or Firm* — NORTON ROSE FULBRIGHT US LLP

(57) ABSTRACT

A method for determining a nitrogen oxide emission and an ammonia emission in the combustion exhaust gas of an engine system having an exhaust-gas-guided internal combustion engine using an output-side nitrogen oxide sensor having a cross-sensitivity to ammonia. The method including: detecting a measurement signal of the nitrogen oxide sensor; ascertaining a partial conversion indication for each of multiple catalytic converter segments arranged in series in the combustion exhaust gas depending on local operating conditions with the aid of a provided conversion model that maps a local operating condition on the partial conversion indication; determining a conversion indication from the multiple partial conversion indications; and ascertaining a nitrogen oxide emission and an ammonia emission depending on the measurement signal and the conversion indication.

14 Claims, 4 Drawing Sheets

(56) References Cited

U.S. PATENT DOCUMENTS

| | | | | |
|---|---|---|---|---|
| 2012/0055789 A1* | 3/2012 | Swartz | ............... | G01N 33/0054 |
| | | | | 204/415 |
| 2014/0032189 A1* | 1/2014 | Hehle | ................... | G16C 10/00 |
| | | | | 703/2 |
| 2014/0298778 A1* | 10/2014 | Riffle | ................ | B01D 53/9409 |
| | | | | 60/276 |
| 2014/0311428 A1* | 10/2014 | Miyagawa | .............. | F01N 3/106 |
| | | | | 123/3 |
| 2018/0163604 A1* | 6/2018 | Wang | ...................... | F01N 9/005 |
| 2019/0024563 A1* | 1/2019 | Wang | ................ | B01D 53/9418 |
| 2019/0136732 A1* | 5/2019 | Lauritano | ............... | F01N 3/208 |
| 2020/0049048 A1* | 2/2020 | Franz | .................... | F01N 3/2066 |
| 2021/0095590 A1* | 4/2021 | Bastoreala | .......... | G01M 15/102 |

\* cited by examiner

METHOD AND DEVICE FOR MEASURING NITROGEN OXIDE AND AMMONIA EMISSIONS FROM AN EXHAUST GAS AFTERTREATMENT SYSTEM FOR COMBUSTION EXHAUST GASES

CROSS REFERENCE

The present application claims the benefit under 35 U.S.C. § 119 of German Patent Application No. DE 10 2022 214 379.5 filed on Dec. 23, 2022, which is expressly incorporated herein by reference in its entirety.

FIELD

The present invention relates to exhaust gas aftertreatment systems, in particular for internal combustion engines, such as diesel engines or gasoline engines, and in particular to a method for measuring the nitrogen oxide and ammonia emissions on the output side of the exhaust gas aftertreatment system in order to control or regulate an engine system having the internal combustion engine.

BACKGROUND INFORMATION

Due to legal requirements, onboard measurement or onboard monitoring of emissions of an engine system having an internal combustion engine, in particular in motor vehicles, is required. Preferably, this monitoring is to be performed with already existing exhaust sensors. Since conventional nitrogen oxide sensors are already used on the output side of an exhaust gas aftertreatment system in motor vehicles, these are used for the required monitoring.

In the case of engine operation with an exhaust gas lambda value of greater than 1, the emitted nitrogen oxide can be detected well. In operating modes of the internal combustion engine which lead to an exhaust gas lambda value (stoichiometric air-fuel ratio of the gas mixture of the combustion exhaust gas) of less than 1, however, ammonia is formed. In addition, the usually used output-side nitrogen oxide sensors have a cross-sensitivity to formed ammonia, so that in certain operating modes of the engine system, an accurate determination of the nitrogen oxide emissions, i.e., the nitrogen oxide concentration or the nitrogen oxide mass flow in the combustion exhaust gas, is not possible. Since ammonia emissions must also be monitored, it is also desirable to measure the ammonia emissions, i.e. the ammonia concentration or the ammonia mass flow in the combustion exhaust gas, on the basis of the measurement signal of the nitrogen oxide sensor.

At present, corresponding nitrogen oxide sensors are mainly used for exhaust gas aftertreatment systems for diesel engines. In particular operating modes having an exhaust gas lambda value of less than 1 occur predominantly in gasoline engines, however, and therefore a possibility of monitoring the aftertreated combustion exhaust gas for ammonia emissions has to be created.

It is therefore an object of the present invention to use a measurement signal of a nitrogen oxide sensor arranged on the output side of an exhaust gas aftertreatment system to determine the nitrogen oxide and ammonia emissions in the combustion exhaust gas of an engine system having a gasoline internal combustion engine.

SUMMARY

The object may be achieved by the method for determining a nitrogen oxide and ammonia emission in the combustion exhaust gas of an engine system having an internal combustion engine having features of the present invention, and a corresponding device and an engine system with an exhaust gas aftertreatment system.

Example embodiments of the present invention are disclosed herein.

According to a first aspect of the present invention, a method is provided for determining a nitrogen oxide emission and an ammonia emission in an exhaust gas flow of an exhaust gas aftertreatment system for an engine system having an in particular air-guided (gasoline) internal combustion engine, having an output-side nitrogen oxide sensor with a cross-sensitivity to ammonia. According to an example embodiment of the present invention, the method includes the following steps:

detecting a measurement signal of the nitrogen oxide sensor;
ascertaining a partial conversion indication for each of multiple catalytic converter segments arranged in series in the exhaust gas flow depending on local operating conditions with the aid of a provided conversion model that maps a local operating condition on the partial conversion indication;
determining a conversion indication from the multiple partial conversion indications;
ascertaining a nitrogen oxide emission and an ammonia emission depending on the measurement signal and the conversion indication.

It can be provided for the nitrogen oxide emission and ammonia emission each to be indicated as a nitrogen oxide concentration and ammonia concentration in the combustion exhaust gas, as a mass fraction in the combustion exhaust gas and/or as a nitrogen oxide and ammonia mass flow.

The determination of the nitrogen oxide emissions and ammonia emissions on the output side of an exhaust gas aftertreatment system, in particular of an engine system having an internal combustion engine, such as a gasoline engine, help to operate the engine system such that a consumption- and emission-related total optimum is achieved. The use of the nitrogen oxide sensor arranged on the output side of the exhaust gas aftertreatment system both for measuring the nitrogen oxide emissions and for measuring the ammonia emissions allows the pollutant emission monitoring to be implemented in a compact way.

The method according to an example embodiment of the present invention provides for the composition of the aftertreated exhaust gas mass flow to be ascertained in a model-based manner and for the measurement signal of the nitrogen oxide sensor arranged on the output side of the exhaust gas aftertreatment system to be evaluated accordingly in order to ascertain the nitrogen oxide emissions and the ammonia emissions. For this purpose, the reduction in the amount of nitrogen oxide is calculated successively in a model-based manner as the combustion exhaust gas flows through individual catalytic converter segments arranged in series in the exhaust gas aftertreatment system, so that an indication about the contribution of the nitrogen oxide emissions and the ammonia emissions is obtained from the resulting measurement signal of the nitrogen oxide sensor on the output side of the last catalytic converter segment.

According to an example embodiment of the present invention, the reduction in the amount of nitrogen oxide can be provided as a conversion indication that indicates the amount of nitrogen oxide that is converted into ammonia. The conversion indication can be provided as an indication that indicates the contributions of the nitrogen oxide emissions and the ammonia emissions and can be indicated in the form of a division factor for consideration with the measurement signal or a conversion factor for consideration with the nitrogen oxide mass flow on the input side.

The conversion indication results from propagation of the combustion exhaust gas when passing through the catalytic converter segments (so-called bricks) arranged in series in the exhaust gas aftertreatment system, wherein only nitrogen oxide (no ammonia, since this is not a constituent of the combustion exhaust gas) is supplied to the input side of the first (furthest upstream) catalytic converter segment. Depending on the operating ranges of the individual catalytic converter segments, the relevant nitrogen oxide fraction in the combustion exhaust gas flowing in on the input side is converted into ammonia and/or $N_2$, $CO_2$ and $H_2O$, depending on the relevant operating range. The ammonia fraction contained can also be converted into $N_2$ and $H_2O$ depending on the operating range.

According to an example embodiment of the present invention, the operating range of the relevant catalytic converter segment can in particular be determined by means of the temperature or the temperature profile in the axial and/or radial direction (in relation to the flow direction of the combustion exhaust gas), the exhaust gas lambda value, the amount of stored oxygen and/or rich gas, and possibly the aging state.

According to an example embodiment of the present invention, the model-based ascertainment of the conversion indication can take place with the aid of a predefined conversion model. The conversion model can be designed as a physical (mathematical) model or as a characteristic map model.

According to an example embodiment of the present invention, it can be provided for the conversion model to take into account at least one of the following variables as operating conditions: a temperature of the catalytic converter segment in question, an amount of stored oxygen, a nitrogen oxide mass flow of nitrogen oxides flowing through, and an exhaust gas mass flow of combustion exhaust gas flowing through.

The formation of ammonia in the individual catalytic converter segments thus depends on the local conditions in each of the catalytic converter segments. In the case of a division factor as a conversion indication, this indicates how the sensor signal would have to be divided if a corresponding nitrogen oxide sensor were located on the output side of the catalytic converter segment under consideration. Thus, the conversion indication respectively applicable after each catalytic converter segment results from the exhaust gas composition, i.e. the nitrogen oxide content and the ammonia content, on the input side of the relevant catalytic converter segment, its temperature or axial temperature profile, the exhaust gas lambda value, and possibly its aging state.

The temperature of the catalytic converter segment or the axial temperature profile can be determined with the aid of a conventional exhaust gas temperature model.

Furthermore, the stored oxygen content in the catalytic converter segment in question determines the conversion between nitrogen oxide and ammonia. The oxygen content can be either ascertained from the information of lambda sensors on the input side and on the output side of the catalytic converter segment or obtained from an O plant model, for example a model-based $O_2$ fill level regulation for the relevant catalytic converter segment. Depending on the amount of oxygen stored, a portion of the ammonia can be reduced again. The conversion indication then changes in the direction of higher nitrogen oxide fractions and lower ammonia fractions in the combustion exhaust gas on the output side.

According to an example embodiment of the present invention, starting from a known nitrogen oxide emission in the combustion exhaust gas that is supplied to the input side of the catalytic converter unit, a nitrogen oxide emission and an ammonia emission can then be ascertained with the aid of the conversion indication, ascertained in a model-based manner, and the measurement signal of the nitrogen oxide sensor, which is usually present in the form of a measurement voltage or a measurement current. The emissions can in each case be indicated as a mass flow of nitrogen oxide or ammonia or as a concentration of the nitrogen oxide or of the ammonia in the combustion exhaust gas.

The nitrogen oxide sensor measures a sum signal, which depends on the nitrogen oxide and ammonia concentrations at the sensor position. This is converted into a nitrogen oxide concentration using the sensor characteristic curve. The nitrogen oxide emission and the ammonia emission can be ascertained on the basis of a measurement sensitivity of the nitrogen oxide sensor with respect to nitrogen oxides and ammonia. The measurement sensitivity is accordingly converted from the sensor signal for the measurement of the nitrogen oxide emission using a sensor characteristic curve predefined for the nitrogen oxide sensor used. The conversion can take place as if 100% of the measurement signal were caused by nitrogen oxide. If there are different measurement sensitivities with respect to the detected nitrogen oxide emission and the ammonia emission on the part of the nitrogen oxide sensor, a correction can be made for the ascertained ammonia emissions depending on the measurement sensitivity ratio to nitrogen oxides and ammonia of the nitrogen oxide sensor.

A difference in the sensor sensitivity of the nitrogen oxide sensor with respect to the detection of ammonia can thus be taken into account in order to ascertain the ammonia emission.

For all approaches, the difference between the value of the measurement signal and the calculated nitrogen oxide emissions at the sensor position is attributable to the presence of ammonia. Using the cross-sensitivity correction, a corrected ammonia concentration in the exhaust gas can be ascertained therefrom.

By means of the previously ascertained conversion indication, the nitrogen oxide concentration in the combustion exhaust gas is calculated on the output side of the exhaust gas aftertreatment system. The difference between NOx raw emissions (i.e., in the present case on the input side of the exhaust gas system) and the reacted nitrogen oxides (according to the conversion indication) results in the physical nitrogen oxide emissions at the sensor position (i.e., on the output side of the exhaust gas aftertreatment system).

The difference between the sensor reading ("100% NOx equivalent") and the calculated NOx emissions at the sensor position of the nitrogen oxide sensor on the output side is attributable to the presence of NH3.

Furthermore, depending on the ratio of the molar mass of the ammonia to the molar mass of the total combustion exhaust gas, an ammonia mass fraction in the exhaust gas mass flow can be determined. This can then be converted into an ammonia mass flow with the total exhaust gas mass flow. Analogously, depending on the ratio of the molar mass of nitrogen oxide to the molar mass of the combustion exhaust gas, a nitrogen oxide mass fraction in the combustion exhaust gas can be determined, and a nitrogen oxide mass flow can be calculated with the aid of the total exhaust gas mass flow.

According to an example embodiment of the present invention, the conversion indication can be indicated as a division factor that indicates a division of the measurement signal into contributions for a nitrogen oxide content and an ammonia content of the combustion exhaust gas.

To ascertain the division factor as a possible conversion indication, a division factor of 1 is initially assumed on the input side, which assigns 100% nitrogen oxide emissions to the combustion exhaust gas. The raw emissions of the internal combustion engine do not yet contain ammonia. Ammonia is formed under certain operating conditions in the catalytic converter segments, depending on the temperature range of the catalytic converter segment or on its axial temperature profile, the exhaust gas lambda value on the input side, the amount of stored oxygen and/or rich gas and the like. Ammonia formation and ammonia degradation depend on local conditions in each of the individual catalytic converter segments and can be ascertained in a model-based manner with the aid of a predefined conversion model. As a result of the serial arrangement of the catalytic converter segments, the division factor can thus be changed step by step by multiplication or optionally addition, so that the division factor to be taken into account, with which a division of the measurement signal of the nitrogen oxide sensor can be carried out, is present on the output side of the last one of the series of catalytic converter segments.

Alternatively, it can be provided for the conversion indication to be indicated as one or more conversion factors indicating a chemically converted fraction of the nitrogen oxide in the combustion exhaust gas flowing through the relevant catalytic converter segment.

According to an example embodiment of the present invention, an alternative approach is to consider the nitrogen oxide mass flow on the input side of the exhaust gas aftertreatment system and to determine as a conversion indication what amount of the nitrogen oxide reacts in each case in a catalytic converter segment on the way through the exhaust gas aftertreatment system. For this purpose, the initial nitrogen oxide raw emissions can be determined by means of a sensor or model. If exhaust gas lambda values are less than 1 in the catalytic converter segments, the nitrogen oxide emissions are either converted into ammonia, on the basis of a first conversion factor, or converted into $CO_2$, $N_2$ and H2O in reactions with the rich gases CO and HC, on the basis of a second conversion factor. The conversion factors indicate the degree of conversion with respect to the volume fractions. The difference between the nitrogen oxide raw emissions and the nitrogen oxides reacted in the catalytic converter segments results in the nitrogen oxide emissions on the output side of the exhaust gas aftertreatment system, i.e., at the sensor position of the nitrogen oxide sensor on the output side.

According to an example embodiment of the present invention, it can be provided for the conversion model to take into account at least one of the following variables as operating conditions: a temperature of the catalytic converter segment in question, an amount of stored oxygen, a nitrogen oxide mass flow of nitrogen oxides flowing through, and an exhaust gas mass flow of combustion exhaust gas flowing through.

The nitrogen oxide emission and the ammonia emission can be used to control an operation of the engine system, in particular to control or regulate an air-fuel ratio, in particular so that the nitrogen oxide emissions and ammonia emissions are minimized.

BRIEF DESCRIPTION OF THE DRAWINGS

Example embodiments of the present invention are explained in more detail below with reference to the figures.

DETAILED DESCRIPTION OF EXAMPLE EMBODIMENTS

Figure 1:
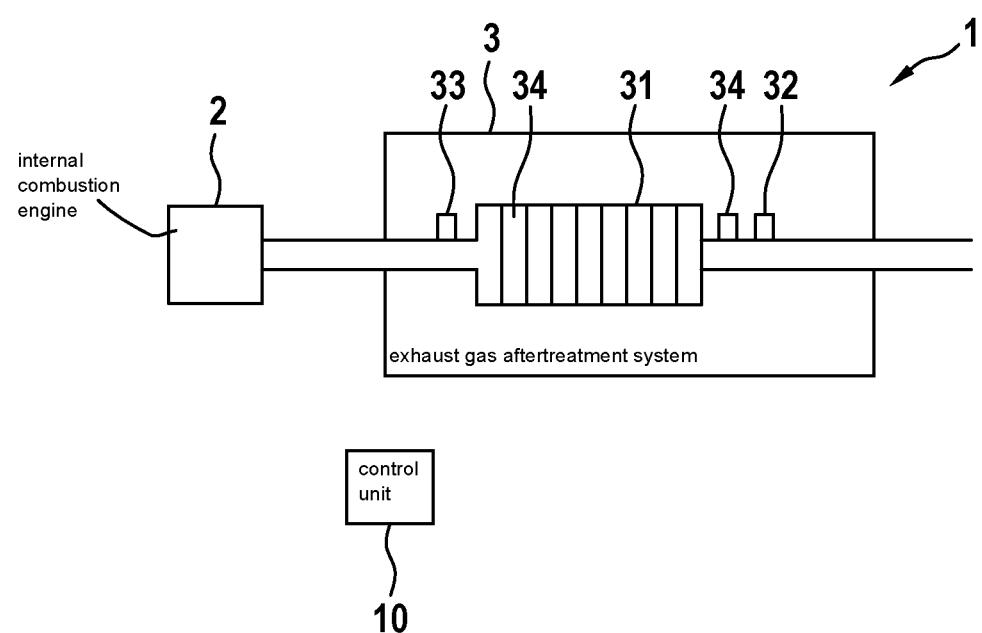
FIG. 1 shows a schematic diagram of an exhaust gas aftertreatment system with a catalytic converter unit having multiple catalytic converter segments.

FIG. 1 schematically shows the representation of an engine system 1 having an internal combustion engine 2, which conducts combustion exhaust gas into an exhaust gas aftertreatment system 3 during operation. The exhaust gas aftertreatment system 3 comprises at least one catalytic converter unit 31, for example in the form of a three-way catalytic converter, in which a nitrogen oxide sensor 32 for monitoring the nitrogen oxide concentration is provided on the output side.

An exhaust gas lambda probe 33 can be provided on the input side of the catalytic converter unit 31 in order to determine an exhaust gas lambda value of the raw exhaust gas emissions. A switching-type lambda probe 34 can accordingly be provided on the output side of the catalytic converter unit 31 in order to determine an indication of an exhaust gas lambda value 34 on the output side of the catalytic converter unit 31. Alternatively, more than one catalytic converter unit 31 can also be provided in the exhaust gas aftertreatment system 3.

The catalytic converter unit 31, for example in the form of the three-way catalytic converter, is constructed from catalytic converter segments 34, which are arranged in series in the exhaust gas flow of the combustion exhaust gas. The substance conversion in the catalytic converter segments 34 can be modeled separately to model a conversion of the nitrogen oxide into ammonia and/or $N_2$, $CO_2$ and $H_2O$.

The fraction of ammonia present on the output side of the last (furthest downstream) catalytic converter segment 34 brings about a change in the measurement signal in the nitrogen oxide sensor 32, since this is generally cross-sensitive to ammonia.

The engine system 1 can be operated in a conventional manner with the aid of a control unit 10, wherein the operating state of the internal combustion engine 2 in particular is generally adapted to the air-fuel mixture burned therein, depending on the exhaust gas lambda value of the combustion exhaust gas, the oxygen fill level of the catalytic converter unit 31, which is generally ascertained in a model-based manner, the nitrogen oxide emissions on the output side, and the like.

The cross-sensitivity of the nitrogen oxide sensor 32 can then be used to assign the remaining nitrogen oxide fraction and the ammonia fraction on the output side of the exhaust gas aftertreatment system 3 to the measurement signal of the nitrogen oxide sensor 32 and to obtain a corresponding division of the nitrogen oxide emissions and ammonia emissions. The emissions can be indicated in the form of a corresponding mass flow of nitrogen oxide or ammonia or a concentration of nitrogen oxide or ammonia in the total aftertreated combustion exhaust gas.

The nitrogen oxide sensor 32 has a cross-sensitivity to nitrogen oxide and ammonia, wherein the sensitivities of the nitrogen oxide sensor 32 can accordingly be different for nitrogen oxide and ammonia.

In order to ascertain which component of the measurement signal measures nitrogen oxide and which component measures ammonia, it is modeled for each of the catalytic converter segments 34 how the conversion of nitrogen oxide into ammonia takes place, i.e. a conversion indication is determined. For each of the catalytic converter segments 34, the modeling can be based on a provided conversion model with a temperature or a temperature profile, a modeled stored oxygen content, an exhaust gas lambda value, a nitrogen oxide content of the raw exhaust gas emissions, and, if applicable, an aging state of the catalytic converter unit 31. The modeling can take place by means of a predefined conversion model, which can be designed, for example, as a parameterized or trained characteristic map model or physical model.

For modeling the conversion of nitrogen oxide into ammonia, or possibly into N2, $CO_2$ and H2O with hydrocarbons included and an exhaust gas lambda value of less than 1, the corresponding conversion model can generally take into account the following criteria: in the case of an exhaust gas lambda value of greater than 1.01, no conversion of the nitrogen oxide into ammonia takes place. Below a light-off temperature for ammonia formation in the catalytic converter unit/catalytic converter segment 34, there is likewise no conversion of the nitrogen oxide. The light-off temperature for ammonia formation depends on the catalyst composition (content of the individual catalytic active noble metals and the like used) and its aging state and must be determined and taken into account experimentally or in a model-/simulation-based manner depending on the aging state. The maximum oxygen storage capacity of the catalytic converter segment in question is usually used as a measure of the aging state of the catalytic converter unit.

Above the light-off temperature for ammonia formation in the relevant catalytic converter segment 34, the measurement signal of the nitrogen oxide sensor 32 corresponds exclusively to the ammonia emission at an exhaust gas lambda value of less than 1.

The exhaust gas lambda value can either be used directly in the conversion model or alternatively be taken into account for ascertaining oxygen fill levels derived therefrom in the catalytic converter segments.

In order to ascertain the temperature of each of the catalytic converter segments 34, a temperature model can be used that models the temperature transmission of combustion exhaust gas to the respective catalytic converter segments 34 physically or in a characteristic-map-based manner. The temperature indication used in the conversion model can relate to a temperature of the relevant catalytic converter segment 34 or to the spatial temperature distribution in the relevant catalytic converter segment 34, i.e. to the axial and/or radial temperature distribution in the catalytic converter segments. The temperatures of the individual catalytic converter segments 34 from the exhaust gas temperature model are either used directly. Alternatively, a derived feature for heating the catalytic converter segment 34 can be used.

In order to jointly consider the individual conversion indications relating to the relevant catalytic converter segment, the gas transit times with which combustion exhaust gas passes through the catalytic converter segments must be taken into account. These gas transit times lead to temporal shifts of the measurement signals among one another and must accordingly be taken into account for correct division of the measurement signal. The gas transit times themselves depend on the volume flow of the exhaust gas, which results from the exhaust gas mass flow, and on the volumes of the exhaust gas lines and catalytic converter segments in the exhaust gas aftertreatment system.

The ammonia concentration can be ascertained on the basis of the sensitivity of the nitrogen oxide sensor 32 to ammonia, which is usually possible mathematically on the basis of the ratio of the molar masses of nitrogen oxide and ammonia, but can also be done experimentally by measuring the nitrogen oxide sensor 32.

Above the light-off temperature of ammonia formation in the catalytic converter unit in an exhaust gas lambda value range of between 1 to 1.01, a suitable division of the measurement signal between ammonia and nitrogen oxide as the cause of the measurement signal must be defined on the basis of the information about the stored oxygen content or the exhaust gas lambda value or the Nernst voltage of the nitrogen oxide sensor 32. The sensitivity of the nitrogen oxide sensor 32 to ammonia must then be taken into account for ammonia. Overall, a conversion into ammonia takes place only when the relevant catalytic converter segment 34 is above the light-off temperature and the lambda value is less than 1.

Figure 2:
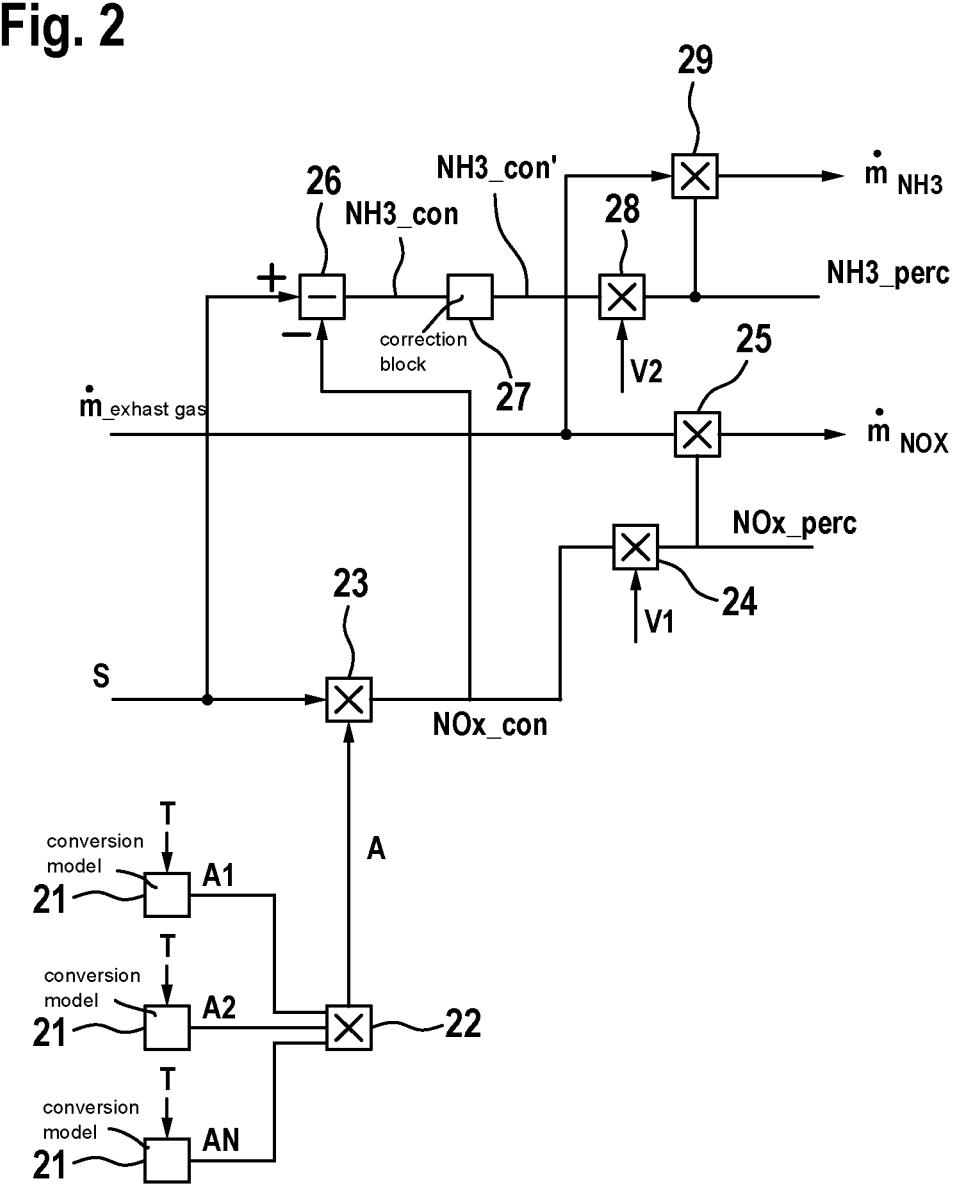
FIG. 2 shows a functional block diagram of a method for ascertaining nitrogen oxide emissions and ammonia emissions depending on a measurement signal of a nitrogen oxide sensor on the output side of the exhaust gas aftertreatment system, according to an example embodiment of the present invention.

FIG. 2 shows a functional block diagram for ascertaining the nitrogen oxide emissions and ammonia emissions on the basis of a conversion model 21, which is applied successively for each catalytic converter segment 34. The resulting partial division factors $A1 \ldots AN$ (N number of catalytic converter segments 34) are multiplied with one another in a first multiplication block 22 in order to determine a division factor A for a measurement signal S of the nitrogen oxide sensor 32. In a second multiplication block 23, the division factor A is multiplied by the value of the measurement signal S in order to obtain a nitrogen oxide concentration NOx_con.

The conversion model 21 determines the relevant partial division factor $A1 \ldots AN$ depending on a modeled or measured exhaust gas lambda value on the input side of a corresponding catalytic converter segment 34 and/or a temperature distribution within the relevant catalytic converter segment 34 and/or a stored oxygen content within the catalytic converter segment 34. For each of the catalytic converter segments 34, the conversion model is applied separately, wherein, on the input side, modeled exhaust gas lambda values, modeled exhaust gas temperatures and modeled stored oxygen content are determined by suitable models, wherein the partial division factor $A1 \ldots AN$ is preferably ascertained in a characteristic-map-based manner or on the basis of a physical model.

The specified models can comprise conventional models, such as an exhaust gas temperature model, for example on the basis of heat balances between the gas phase and the solid phase with respect to catalytic converter segment and environment; as well as heat capacities and the like, a reaction-kinetic catalyst model, which maps the chemical conversion, including the oxygen storage and storage of rich gases in the catalytic converter segment, and also the conversion of substance concentrations, and in turn ascertains the lambda value in the catalytic converter segments from the substance concentrations after the reactions, and a physically based model or a characteristic map model or a data-based model, such as a Gaussian process model or a neural network and the like.

From the nitrogen oxide concentration NOx_con, a nitrogen oxide mass fraction NOx_perc in the exhaust gas can be determined by multiplication in a third multiplication block 24 by the ratio V1 of the molar mass of nitrogen oxide to give the molar mass of the combustion exhaust gas. Correspondingly, the nitrogen oxide mass fraction NOx_perc can be determined by multiplication in a fourth multiplication block 25 by the total exhaust gas mass flow $\dot{m}_{exhaust\ gas}$ to determine a nitrogen oxide mass flow $\dot{m}_{NOx}$.

The nitrogen oxide concentration NOx_con can be subtracted from the measurement signal S (normalized to 100% when the ratio of the fractions is 100% nitrogen oxide to 0% ammonia) in a subtraction block 26 in order to obtain a percentage ammonia concentration NH3_con in the combustion exhaust gas in relation to the total content of nitrogen oxide and ammonia.

By means of a sensitivity correction in a correction block 27, the different sensitivities of the nitrogen oxide sensor 32 to nitrogen oxide and ammonia can be taken into account with a predefined correction factor (in particular by multiplication) and thus corrected. By multiplication in a fifth multiplication block 28, the corrected ammonia concentration NH3_con' can be multiplied by the ratio V2 of the molar mass of ammonia to give the molar mass of the combustion exhaust gas in order to determine an ammonia mass fraction NH3_perc in the combustion exhaust gas.

By multiplication in a sixth multiplication block 29 by the exhaust gas mass flow $\dot{m}_{exhaust\ gas}$, an ammonia mass flow $\dot{m}_{NH3}$ can accordingly be determined.

Figure 3:
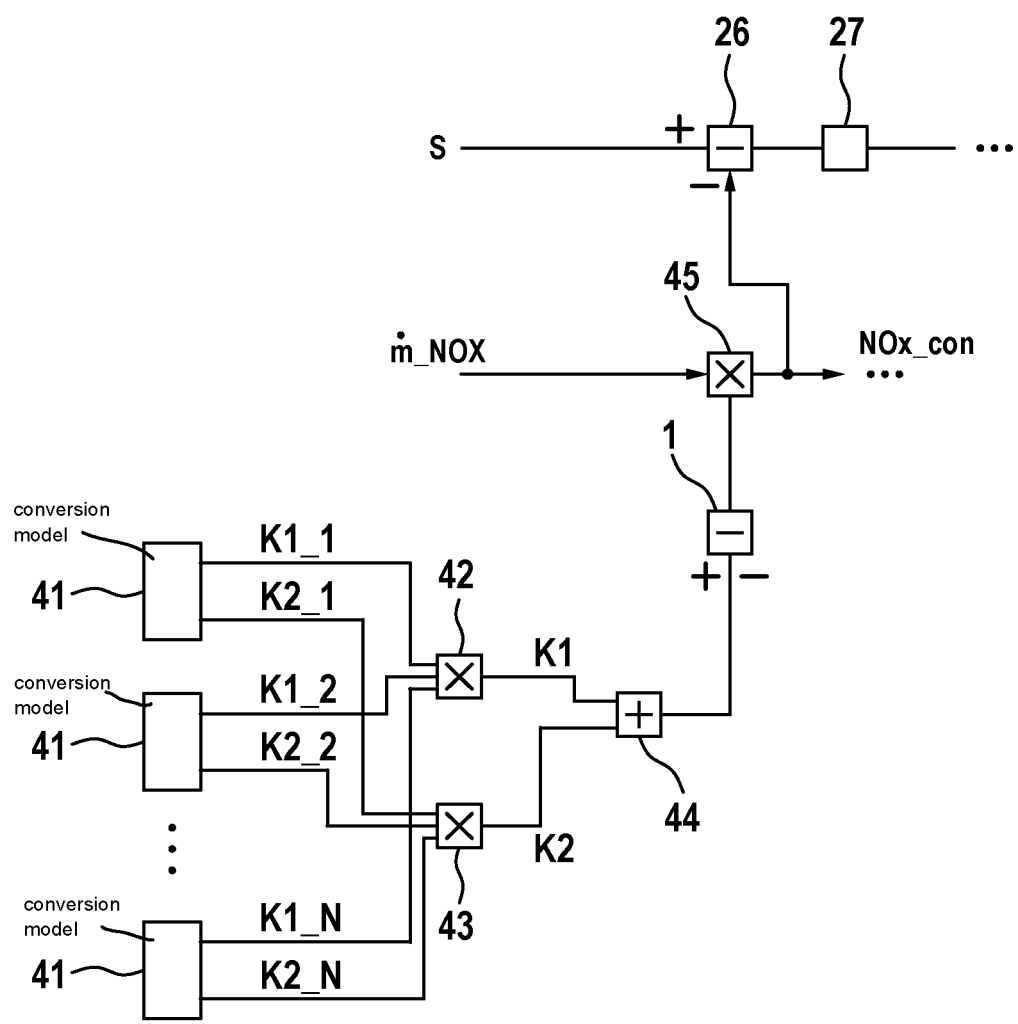
FIG. 3 shows a block diagram for illustrating the ascertainment of the nitrogen oxide emissions and ammonia emissions on the basis of the nitrogen oxide conversion in the individual catalytic converter segments, according to an example embodiment of the present invention.

According to the alternative functional block diagram of FIG. 3, the conversion models 41 can be designed such that partial conversion factors K1_1 ... K1_N, K2_1 ... K2_N for the conversion of nitrogen oxide into ammonia or of nitrogen oxide in conjunction with hydrocarbons from the combustion exhaust gas into $N_2$, $CO_2$ and $H_2O$ are determined. The partial conversion factors K1_1 ... K1_N are multiplied by one another in a seventh multiplication block 42, and the partial conversion factors K2_1 ... K2_N are multiplied by one another in an eighth multiplication block 43.

The resulting conversion factors K1, K2 are added to one another in an addition block 44 and subtracted from 1 in order to obtain the fraction of unconverted nitrogen oxides in the original/input-side nitrogen oxide mass flow $\dot{m}_{NOx}$ (volume fraction of the exhaust gas mass flow). The original/input-side nitrogen oxide mass flow $\dot{m}_{NOx}$ (volume fraction of the exhaust gas mass flow) can be ascertained in a model-based manner for an operating point of the internal combustion engine or can be measured with the aid of a nitrogen oxide sensor on the input side. The original/input-side nitrogen oxide mass flow $\dot{m}_{NOx}$ (volume fraction of the exhaust gas mass flow) is multiplied by the fraction of unconverted nitrogen oxides in a ninth multiplication block 45 in order to obtain the nitrogen oxide concentration NOx_con on the output side of the exhaust gas aftertreatment system.

Accordingly, the nitrogen oxide emissions and the ammonia emissions can be ascertained as in connection with the embodiment of FIG. 2. From the nitrogen oxide concentration NOx_con, the nitrogen oxide mass fraction and the nitrogen oxide mass flow can then correspondingly be ascertained with the aid of the total exhaust gas mass flow, as described in connection with FIG. 2.

Figure 4:
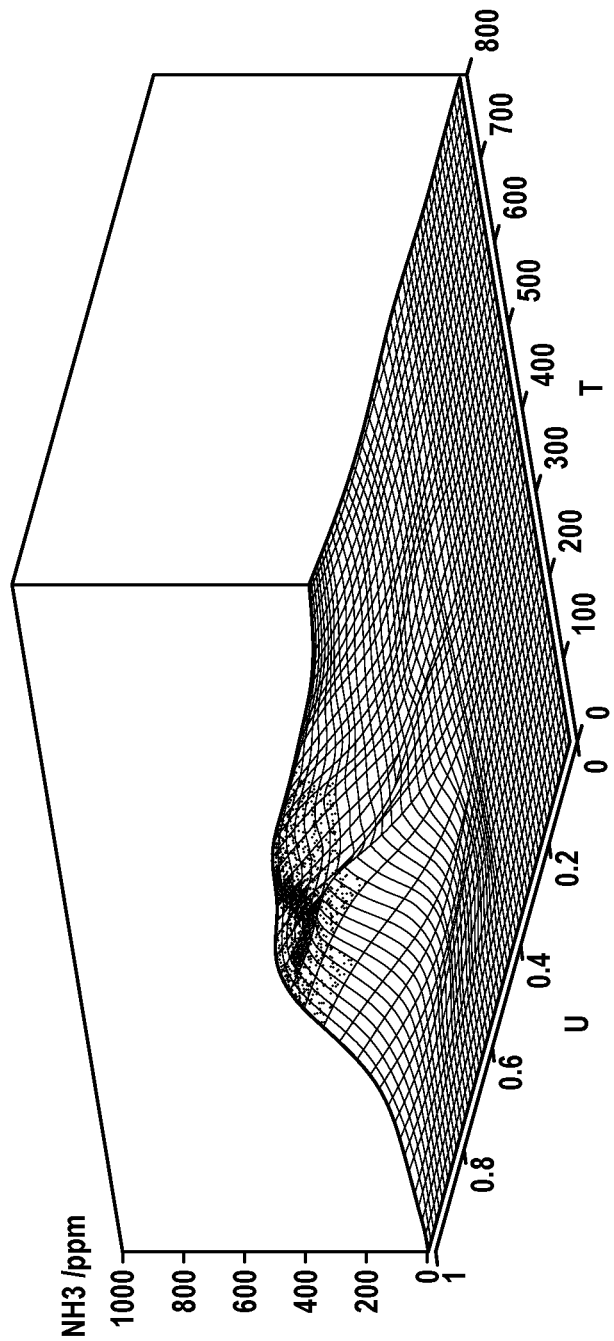
FIG. 4 shows a diagram of a characteristic map that maps a Nernst voltage of the nitrogen oxide sensor and a corresponding temperature of the catalytic converter segment on an ammonia concentration.

The conversion model 21, 41 can take into account the temperature of the relevant catalytic converter segment 34 depending on an aging state of the catalytic converter unit. This can be done, for example, with the aid of a characteristic map that takes into account the Nernst voltage U of the nitrogen oxide sensor and the corresponding temperature T of the catalytic converter segment 34. Ammonia formation can then be taken from the characteristic map. Such a characteristic map is shown graphically by way of example in FIG. 4.

The temperature criterion at the start of ammonia formation in the catalytic converter unit must be adapted to the aging behavior of the catalytic converter. The activation temperature can, for example, be determined experimentally for new and aged catalytic converter units. Alternatively, the determination can be determined on the basis of catalytic converter characteristic values, such as information regarding the light-off behavior and the like.

Furthermore, a predetermined aging factor or an aging correction value can be used to adapt the activation temperature, wherein the aging factor depends on usage-dependent variables and the calendar age of the catalytic converter unit. In particular, the aging factor can be determined by linear interpolation between new and completely aged catalytic converter units with service life information, such as, for example, odometer reading, operating hour counter, integrated exhaust gas mass flow, air flow exhaust gas heat flow, or another characteristic variable describing the service life. Furthermore, the activation temperature can be determined by measuring an oxygen storage capacity of the catalytic converter during its heat-up operation. Due to the storage capacity of the catalytic converter, attenuation of the lambda signal occurs when the catalytic converter is in active operation. By measurement or estimation from the exhaust gas temperature model from which the attenuation occurs, the activation temperature can be deduced.

What is claimed is:

1. A control method for an internal combustion engine that is part of a system that includes an exhaust gas aftertreatment system and an output-side nitrogen oxide sensor, the exhaust gas aftertreatment system including multiple catalytic converter segments that (I) form a single catalytic converter, (II) are arranged in series along an exhaust gas flow path of exhaust gas output from the internal combustion engine, (III) are each structured to perform a catalytic reduction reaction by which nitrogen oxide is at least partially convertible into ammonia, and (IV) are structured and arranged such that (i) a respective extent of nitrogen oxide conversion within each of the catalytic converter segments depends on respective local operating conditions at the respective segment at the time of the respective conversion by the respective segment, and (ii) for each of those of the segments that are downstream, with respect to the exhaust gas flow path, from at least one other of the segments, the respective extent of the nitrogen oxide conversion by the respective segment further depends on a respective composition of exhaust gas output from an immediately adjacent upstream one of the segments, the method comprising the following steps:

obtaining a measurement signal from the output-side nitrogen oxide sensor;

ascertaining a partial conversion indication for each of the multiple catalytic converter segments using a conversion model based on the respective local operating conditions, wherein:

the conversion model separately models respective conversion characteristics of each of the catalytic converter segments; and for each of those of the segments that are downstream, with respect to said exhaust gas flow, from at least one other of said segments, the modeling of the respective conversion characteristics of the respective catalytic converter segment takes into consideration respective output of the modeling by the conversion model of the immediately adjacent upstream one of the segments;

determining a combined conversion indication that is indicated by the measurement signal from the output-side nitrogen oxide sensor based on the multiple partial conversion indications, wherein the determination of the combined conversion indication includes ascertaining respective total amounts of nitrogen oxide emission and ammonia emission in output exhaust gas at and sensed by the nitrogen oxide sensor; and controlling operation of the internal combustion engine based on the determined respective amounts of nitrogen oxide and ammonia emissions.

2. The method according to claim 1, wherein the respective amounts of nitrogen oxide emission and the ammonia emission are ascertained as respective concentrations in the exhaust gas or as respective mass fractions in the exhaust gas or as respective mass flows in the exhaust gas.

3. The method according to claim 1, wherein the combined conversion indication is indicated as a division factor that indicates a division of the measurement signal into contributions to the measurement signal by a nitrogen oxide content and an ammonia content of the combustion exhaust gas.

4. The method according to claim 1, wherein the combined conversion indication is indicated as one or more conversion factors indicating a chemically converted fraction of the nitrogen oxide in the combustion exhaust gas flowing through a relevant catalytic converter segment of the multiple catalytic converter segments.

5. The method according to claim 1, wherein a difference in a sensor sensitivity of the nitrogen oxide sensor with respect to the detection of ammonia as compared to nitrogen oxide is taken into account to ascertain the ammonia emission.

6. The method according to claim 1, wherein the respective local operating conditions used for the ascertainment of the partial conversion indications include at least a temperature of the respective catalytic converter segment.

7. The method according to claim 1, wherein the conversion model is provided as a physical model or as a characteristic map model.

8. The method according to claim 1, wherein the controlling includes regulating an air-fuel ratio of the internal combustion engine.

9. The method according to claim 1, wherein the respective local operating conditions used for the ascertainment of the partial conversion indications include at least a respective amount of stored oxygen and/or rich gas.

10. The method according to claim 1, wherein the respective local operating conditions used for the ascertainment of the partial conversion indications include at least a respective nitrogen oxide mass flow of nitrogen oxides flowing through the respective catalytic converter segment.

11. The method according to claim 1, wherein the respective local operating conditions used for the ascertainment of the partial conversion indications include at least a respective exhaust gas mass flow of combustion exhaust gas flowing through the respective catalytic converter segment.

12. The method according to claim 1, wherein the multiple catalytic converter segments are arranged such that, for the each of those of the segments that are downstream, with respect to the exhaust gas flow path, from the at least one other of the segments, all gas input to the respective segment is gas output from the respective other segment that is immediately adjacent to the respective segment in the upstream direction.

13. A system comprising:

an internal combustion engine;

an exhaust gas aftertreatment system, wherein the exhaust gas aftertreatment system includes multiple catalytic converter segments that:

form a single catalytic converter;

are arranged in series along an exhaust gas flow path of exhaust gas output from the internal combustion engine;

are each structured to perform a catalytic reduction reaction by which nitrogen oxide is at least partially convertible into ammonia; and are structured and arranged such that:

a respective extent of nitrogen oxide conversion within each of the catalytic converter segments depends on respective local operating conditions at the respective segment at the time of the respective conversion by the respective segment; and for each of those of the segments that are downstream, with respect to the exhaust gas flow path, from at least one other of the segments, the respective extent of the nitrogen oxide conversion by the respective segment further depends on a respective composition of exhaust gas output from an immediately adjacent upstream one of the segments;

an output-side nitrogen oxide sensor; and an engine controller, wherein the engine controller is configured to:

obtain a measurement signal from the output-side nitrogen oxide sensor;

ascertain a partial conversion indication for each of multiple catalytic converter segments arranged in series in the combustion exhaust gas depending on local operating conditions using a provided conversion model that maps a local operating condition on the partial conversion indication;

determine a conversion indication from the multiple partial conversion indications;

ascertain a partial conversion indication for each of the multiple catalytic converter segments using a conversion model based on the respective local operating conditions, wherein (I) the conversion model separately models respective conversion characteristics of each of the catalytic converter segments, and (II) for each of those of the segments that are downstream, with respect to said exhaust gas flow, from at least one other of said segments, the modeling of the respective conversion characteristics of the respective catalytic converter segment takes into consideration respective output of the modeling by the conversion model of the immediately adjacent upstream one of the segments;

determine a combined conversion indication that is indicated by the measurement signal from the output-side nitrogen oxide sensor based on the multiple partial conversion indications, wherein the determination of the combined conversion indication includes ascertaining respective total amounts of nitrogen oxide emission and ammonia emission in output exhaust gas at and sensed by the nitrogen oxide sensor; and control operation of the internal combustion engine based on the determined respective amounts of nitrogen oxide and ammonia emissions.

14. A non-transitory machine-readable storage medium on which are stored instructions that are executable by a processor and that, when executed by the processor, cause the processor to perform a control method for an internal combustion engine that is part of a system that includes an exhaust gas aftertreatment system and an output-side nitrogen oxide sensor, the exhaust gas aftertreatment system including multiple catalytic converter segments that (I) form a single catalytic converter, (II) are arranged in series along an exhaust gas flow path of exhaust gas output from the internal combustion engine, (III) are each structured to perform a catalytic reduction reaction by which nitrogen oxide is at least partially convertible into ammonia, and (IV) are structured and arranged such that (i) a respective extent of nitrogen oxide conversion within each of the catalytic converter segments depends on respective local operating conditions at the respective segment at the time of the respective conversion by the respective segment, and (ii) for each of those of the segments that are downstream, with respect to the exhaust gas flow path, from at least one other of the segments, the respective extent of the nitrogen oxide conversion by the respective segment further depends on a respective composition of exhaust gas output from an immediately adjacent upstream one of the segments, the method comprising the following steps:

obtaining a measurement signal from the output-side nitrogen oxide sensor;

ascertaining a partial conversion indication for each of the multiple catalytic converter segments using a conversion model based on the respective local operating conditions, wherein:

the conversion model separately models respective conversion characteristics of each of the catalytic converter segments; and for each of those of the segments that are downstream, with respect to said exhaust gas flow, from at least one other of said segments, the modeling of the respective conversion characteristics of the respective catalytic converter segment takes into consideration respective output of the modeling by the conversion model of the immediately adjacent upstream one of the segments;

determining a combined conversion indication that is indicated by the measurement signal from the output-side nitrogen oxide sensor based on the multiple partial conversion indications, wherein the determination of the combined conversion indication includes ascertaining respective total amounts of nitrogen oxide emission and ammonia emission in output exhaust gas at and sensed by the nitrogen oxide sensor; and controlling operation of the internal combustion engine based on the determined respective amounts of nitrogen oxide and ammonia emissions.

* * * * *